(12) United States Patent
Mazur

(10) Patent No.: US 9,902,328 B1
(45) Date of Patent: Feb. 27, 2018

(54) RETRACTABLE TAILGATE STEP

(71) Applicant: Blaine Mazur, Calgary (CA)

(72) Inventor: Blaine Mazur, Calgary (CA)

( * ) Notice: Subject to any disclaimer, the term of this patent is extended or adjusted under 35 U.S.C. 154(b) by 0 days.

(21) Appl. No.: 15/641,070

(22) Filed: Jul. 3, 2017

(51) Int. Cl.
*B60R 3/02* (2006.01)

(52) U.S. Cl.
CPC ..................... *B60R 3/02* (2013.01)

(58) Field of Classification Search
CPC ............. B60R 3/00; B60R 3/02; B60R 3/007
USPC .............................. 280/166, 163, 164.1, 169
See application file for complete search history.

(56) References Cited

U.S. PATENT DOCUMENTS

| | | | | |
|---|---|---|---|---|
| 5,549,312 A * | 8/1996 | Garvert | .................... | B60R 3/02 280/166 |
| 6,857,680 B2 * | 2/2005 | Fielding | ............... | B60N 2/3015 280/166 |
| 7,896,419 B2 * | 3/2011 | Elliott | ................ | B62D 33/0273 280/166 |
| 8,182,013 B1 * | 5/2012 | Alvarado | ................ | B60R 3/007 182/127 |
| 8,444,201 B1 * | 5/2013 | Crawford | .................. | B60R 3/02 296/50 |
| 8,505,944 B2 * | 8/2013 | Genest | ...................... | B60R 3/02 280/166 |

* cited by examiner

Primary Examiner — John D Walters
(74) Attorney, Agent, or Firm — Orin Del Vecchio

(57) ABSTRACT

The present invention relates to a retractable step assembly for a vehicle tailgate, comprising: a platform, the platform securable to the vehicle tailgate, the platform having a pair of frame arms, a pair of support arms, each support arm slidably connected to one of the frame arms; a pair of extension arms, each extension arm rotatably secured to one of the support arms; and a step, the step rotatably secured to each of the extension arms, wherein the step is extendable by movement of the support arms and extension arms to a position below the platform, and retractable by movement of the support arms and extension arms to a position in contact with the platform; and wherein the support arms, the extension arms and the step are all positioned within the perimeter of the platform when in a retracted position.

16 Claims, 3 Drawing Sheets

RETRACTABLE TAILGATE STEP

FIELD OF THE INVENTION

The present specification relates generally to a step assembly for tailgates, and more particularly to a retractable and foldable step assembly for use for tailgates on pickup trucks and similar vehicles.

BACKGROUND OF THE INVENTION

A tailgate is a standard feature on a pickup truck or similar vehicle. An issue for users is that, when lowered, the tailgate is often at a height greater than the user may easily climb. This may lead to awkwardness and potential safety risks in loading and unloading the vehicle. One modification is to secure a step to the tailgate which may be unfolded when needed.

However, the presence of the step may create potential interference with the operation of tailgate. Additionally, many pickup truck have canopies, box covers, tonneau covers or other attachments which are secured to the box of the truck. The presence of a step secured to the tailgate may prevent such attachments from being properly secured to the vehicle, or even used at all.

While there are some step modifications for tailgates known in the art, it would be desirable to have an step modification for a tailgate which mitigates some of the disadvantages.

Accordingly, there remains a need for improvements in the art.

SUMMARY OF THE INVENTION

In accordance with an aspect of the invention, there is provided a retractable step assembly for use with a vehicle tailgate.

According to an embodiment of the invention, there is provided a retractable step assembly for a vehicle tailgate, comprising: a platform, the platform securable to the vehicle tailgate, with an edge of the platform positioned at least 2½ inches from the top edge of the tailgate, and the platform having a pair of frame arms, each frame arm positioned along an edge of the platform and perpendicular to the top edge of the tailgate when the platform is secured; a pair of support arms, each support arm connected to one of the frame arms and slidable along a first axis parallel to the platform; a pair of extension arms, each extension arm secured at one end to one of the support arms and rotatable around a second axis parallel to the platform and perpendicular to the first axis; and a step, the step secured to each of the extension arms and a second end of each extension arm opposite to the first end, the step rotatable about a third axis parallel with the second axis, wherein the step is extendable by movement of the support arms and extension arms to a position below the platform, and retractable by movement of the support arms and extension arms to a position in contact with the platform; and wherein the support arms, the extension arms and the step are all positioned within the perimeter of the platform when in a retracted position.

According to a further embodiment of the invention, there is provided a kit for a retractable step assembly for a vehicle tailgate, comprising: a platform, the platform securable to the vehicle tailgate, with an edge of the platform positioned at least 2½ inches from the top edge of the tailgate, and the platform having a pair of frame arms, each frame arm positioned along an edge of the platform and perpendicular to the top edge of the tailgate when the platform is secured; a pair of support arms, each support arm connected to one of the frame arms and slidable along a first axis parallel to the platform; a pair of extension arms, each extension arm secured at one end to one of the support arms and rotatable around a second axis parallel to the platform and perpendicular to the first axis; and a step, the step secured to each of the extension arms and a second end of each extension arm opposite to the first end, the step rotatable about a third axis parallel with the second axis, wherein the step is extendable by movement of the support arms and extension arms to a position below the platform, and retractable by movement of the support arms and extension arms to a position in contact with the platform; and wherein the support arms, the extension arms and the step are all positioned within the perimeter of the platform when in a retracted position.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates to modification to vehicles and, in particular, a retractable step assembly for use with vehicle tailgates.

Figure 1:
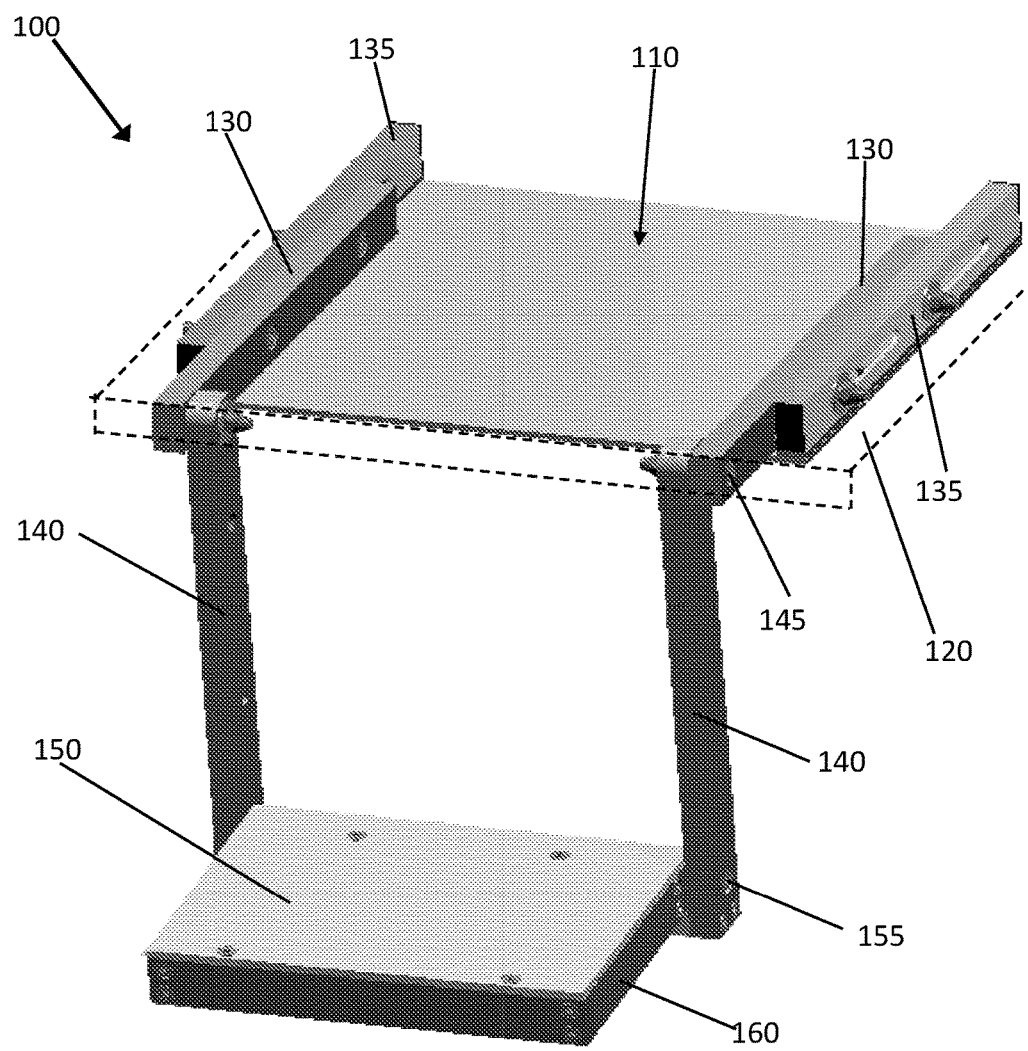
FIG. 1 is a perspective view of a retractable step assembly in an unfolded position according to an embodiment.

According to an embodiment as shown in FIG. 1 a retractable step assembly 100 is designed for use with a vehicle tailgate, such as on a pickup truck. The step assembly 100 is based on a rigid platform 110 which may be secured to the vehicle tailgate 120. The platform 110 may be secured by screws (e.g. self-tapping sheet metal screws), bolts, by welding, or by other methods as known in the art. One edge of platform 110 is positioned at least 2½ inches from the top edge of tailgate 120, and is substantially parallel to that edge. A pair of frame arms 135 are secured to opposite sides of the platform 110 and oriented generally parallel to the platform 110 and perpendicular to the edge of tailgate 120. As shown in FIG. 1, a pair of support arms 130 are further attached to frame arms 135. Each support arm 130 is slidably engaged with a frame arm 135 to permit movement of the support arms 130 along an axis parallel to the surface of the platform 110.

A pair of extension arms 140 are each secured to one of the support arms 130. Each extension arm 140 may be rotated relative to the support arms 130 along an axis parallel to the edge of platform 110 and perpendicular to support arms 130. Extension arms 140 are generally similar in dimension to support arms 130, however, the dimensions may be modified based on the size of the vehicle and tailgate, and the materials used in construction. A locking knob 145 is secured (e.g. threaded and/or adhered) in one of extension arms 140 such that a protruding shaft of locking knob 145 engages a hole in support arm 130 to secure extension arms 140 in position once unfolded.

A step 150 is secured between extension arms 140 via side arms 160. Step 150 is rotatable via side arms 160 relative to the extension arms 140 along an axis parallel to the axis of rotation of the extension arms. Step 150 may be rotated into a position such that step 150 is substantially parallel to platform 110 and tailgate 120, and is thus substantially parallel to the ground when tailgate 120 is open. A locking knob 155 is secured (e.g. threaded and/or adhered) in one of side arms 160 such that a protruding shaft of locking knob 155 engages a hole in an extension arm 140 to secure side arm 160 and step 150 in position once unfolded. For ease of use, both locking knobs 145 and 155 may be located on the same side of step assembly 100.

Figure 2:
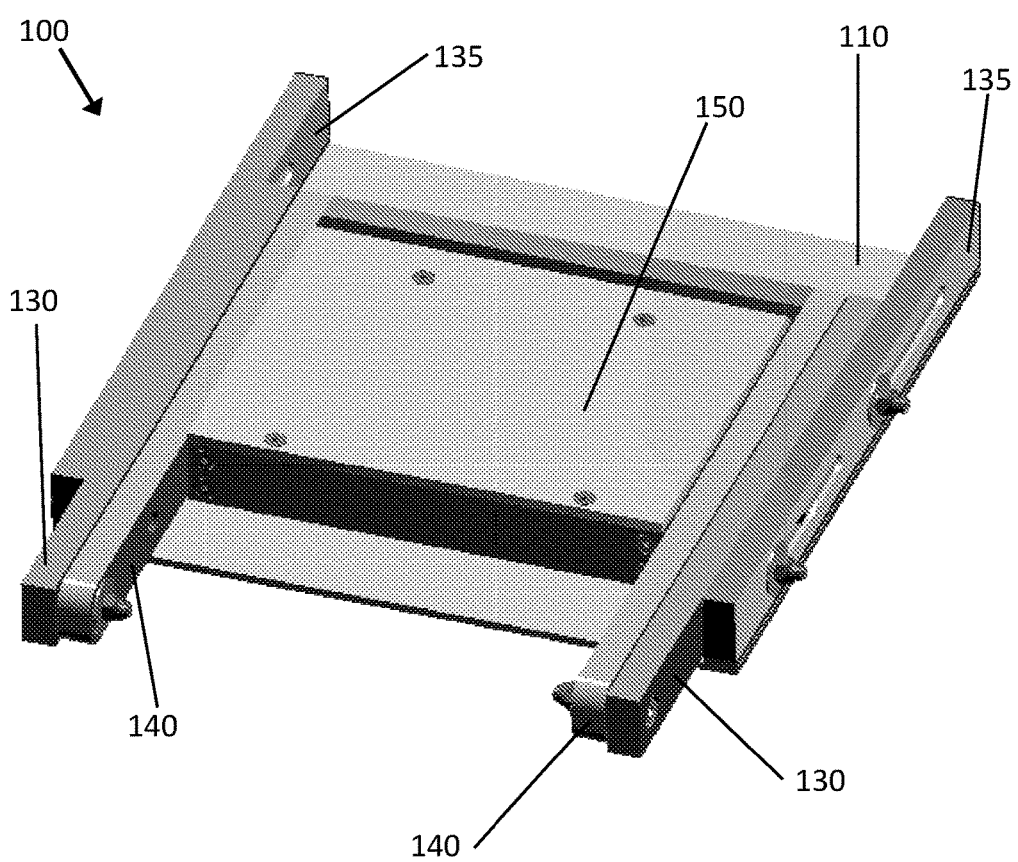
FIG. 2 is a perspective view of the step assembly of FIG. 1 in a partially retracted position.

The combination of frame arms 135, support arms 130 and extension arms 140 creates a sliding, reciprocating assembly that permits step 150 to be unfolded from and retracted against platform 110 as shown in FIGS. 1 and 2. Thus, step 150 may be retracted and stored against the tailgate 120 to minimize the impact on the vehicle cargo space from the installation of the step assembly 100. In some cases, the weight of step 150 may be sufficient for it to remain in position without an additional locking mechanism. However, a locking mechanism may be included as part of platform 100 to lock step 150 into position when retracted, to prevent accidental movement while the vehicle is in motion.

Figure 3:
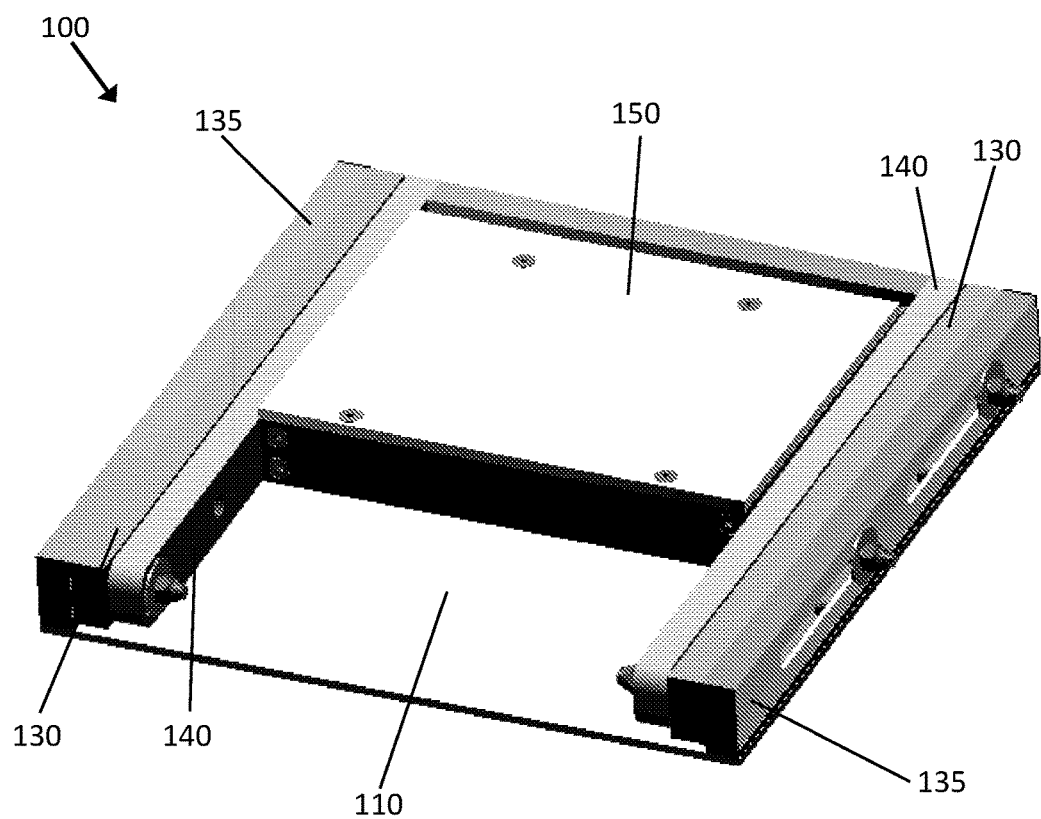
FIG. 3 is a perspective view of the step assembly of FIG. 1 in a fully retracted position.

Further, as shown in FIG. 3, with support arms 130 slidably engaged with frame arms 135, the step 150 and extension arms 140 may be additionally retracted to a position along platform 110 where none of support arms 130, extension arms 140 or step 150 protrude are less than 2½ inches from the top edge of tailgate 130. Thus, the step assembly 100 does not interfere with the placement of a bed/tailgate cover, such as a rolling box cover, canopy or tonneau cover or any element that is to be secured to the truck box.

As shown, the platform 110 and the step 150 are rectangular in shape. However, other shapes (square, oval) may be used, and the platform 110 and step 150 need not be the same shape, as long as the step 150 and the support arms 130 and extension arms 140 fit within the perimeter of the platform 110 when retracted.

Preferably, all parts of step assembly 100 are formed from high-quality steel or aluminum or equivalent materials. Platform 110 and step 150 are preferably formed from a heavy-gauge steel or aluminum to reduce the risk of warping and damage over time.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A retractable step assembly for a vehicle tailgate, comprising:
   a platform, the platform securable to the vehicle tailgate, with an edge of the platform positioned at least 2½ inches below a top edge of the tailgate, and the platform having a pair of frame arms, each frame arm positioned along an edge of the platform and perpendicular to the top edge of the tailgate when the platform is secured;
   a pair of support arms, each support arm connected to one of the frame arms and slidable along a first axis parallel to the platform;
   a pair of extension arms, each extension arm secured at one end to one of the support arms and rotatable around a second axis parallel to the platform and perpendicular to the first axis; and
   a step, the step secured to each of the extension arms and a second end of each extension arm opposite to the first end, the step rotatable about a third axis parallel with the second axis,
   wherein the step is extendable by movement of the support arms and extension arms to a position below the platform, and retractable by movement of the support arms and extension arms to a position in contact with the platform; and
   wherein the support arms, the extension arms and the step are all positioned within the perimeter of the platform when in a retracted position.

2. The retractable step assembly of claim 1, wherein the extension arms and the support arms are of similar length.

3. The retractable step assembly of claim 1, wherein the frame arms, the extension arms and the support arm are of similar length.

4. The retractable step assembly of claim 1, further including a locking mechanism to secure the step in the retracted position.

5. The retractable step assembly of claim 4, wherein the locking mechanism is part of the platform.

6. The retractable step assembly of claim 1, wherein the platform and the step are rectangular.

7. The retractable step assembly of claim 1, wherein one of the extension arms includes a first slidable locking knob which engages a hole in one of the support arms to lock the extension arms in an extended position and the step includes a side arm with a second slidable locking knob which engages a hole in one of the extension arms to lock the step in an extended position.

8. The retractable step assembly of claim 7, wherein the first slidable locking knob and the second slidable locking knob are located on the same side of the step assembly.

9. A kit for a retractable step assembly for a vehicle tailgate, comprising:
   a platform, the platform securable to the vehicle tailgate, the platform secured with an edge of the platform aligned positioned at least 2½ inches below a top edge of the tailgate, and the platform having a pair of frame arms, each frame arm positioned along an edge of the platform and perpendicular to the top edge of the tailgate when the platform is secured;
   a pair of support arms, each support arm connected to one of the frame arms and slidable along a first axis parallel to the platform;
   a pair of extension arms, each extension arm secured at one end to one of the support arms and rotatable around a second axis parallel to the platform and perpendicular to the first axis; and
   a step, the step secured to each of the extension arms and a second end of each extension arm opposite to the first end, the step rotatable about a third axis parallel with the second axis, wherein the step is extendable by movement of the support arms and extension arms to a position below the platform, and retractable by movement of the support arms and extension arms to a position in contact with the platform; and wherein the support arms, the extension arms and the step are all positioned within the perimeter of the platform when in a retracted position.

10. The kit of claim 9, wherein the extension arms and the support arms are of similar length.

11. The kit of claim 9, wherein the frame arms, the extension arms and the support arm are of similar length.

12. The kit of claim 9, further including a locking mechanism to secure the step in the retracted position.

13. The kit of claim 12, wherein the locking mechanism is part of the platform.

14. The kit of claim 9, wherein the platform and the step are rectangular.

15. The kit of claim 9, wherein one of the extension arms includes a first slidable locking knob which engages a hole in one of the support arms to lock the extension arms in an extended position and the step includes a side arm with a second slidable locking knob which engages a hole in one of the extension arms to lock the step in an extended position.

16. The kit of claim 15, wherein the first slidable locking knob and the second slidable locking knob are located on the same side of the step assembly when assembled.

* * * * *